Aug. 13, 1940.       R. C. TAYLOR       2,210,961
METHOD OF REFORMING BAILS
Filed March 22, 1939
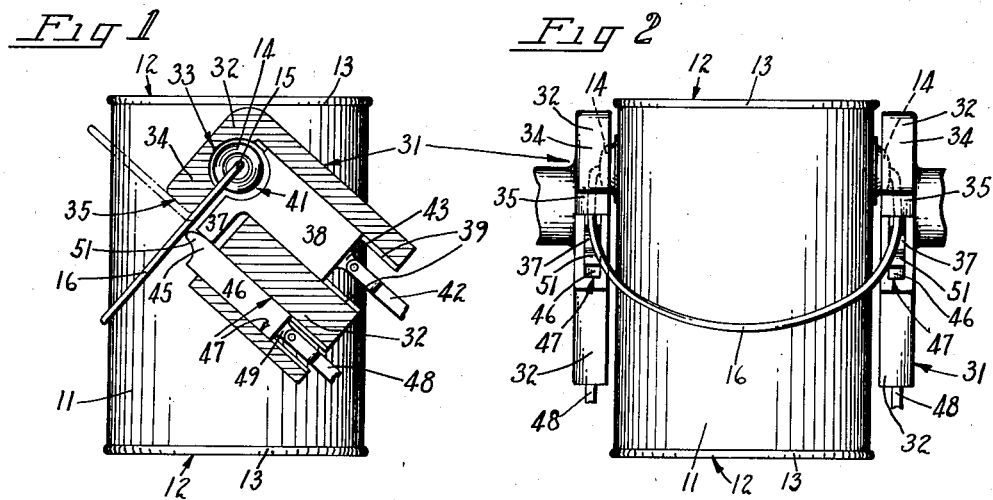
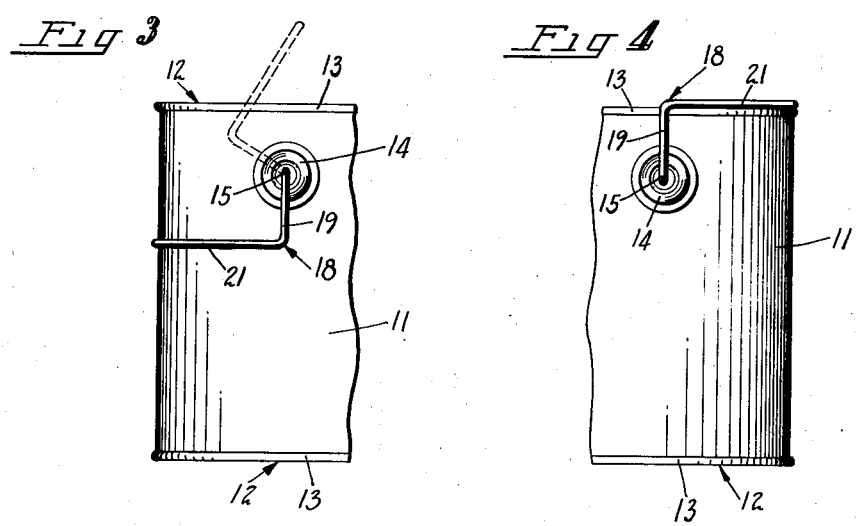
INVENTOR.
Russell C. Taylor
BY Ivan D. Thornburgh
Charles H. Crue
ATTORNEYS Patented Aug. 13, 1940

2,210,961

UNITED STATES PATENT OFFICE 2,210,961

METHOD OF REFORMING BAILS

Russell C. Taylor, Greenwich, Conn., assignor to American Can Company, New York, N. Y., a corporation of New Jersey Application March 22, 1939, Serial No. 263,519

4 Claims. (Cl. 140—75)

The present invention relates to bails or handles for containers and has particular reference to reforming the bail after it is attached to the container so that it will seat on top of the container when it is not in use.

In containers of the type having bails secured in bail ears, such as for example paint pails and the like, the bail usually hangs down adjacent the side wall of the container. In some instances this hanging bail interferes with proper packing of the filled containers into cartons for shipment and storage. Where lithographing is used on the side walls of the containers the hanging bails often rub against it and thus unduly mar the container and hence detract from its appearance.

The instant invention contemplates overcoming these difficulties by bending portions of the bail at an angle to the remaining unbent portion so that the bent portion will seat on top of the container when the bail is rotated in its ears.

An object, therefore, of the invention is a method of reforming a straight container bail after it has been attached to a container and in such a manner that the reformed bail when not in position for carrying, will rest on top of the container where it is out of the way and where it cannot mar the container side walls and such containers will be more compact for packing in cartons for storage and shipment, the reforming of the bail depreciating in no way from its usefulness as a bail.

Numerous other objects and advantages of the invention will be apparent as it is better understood from the following description, which, taken in connection with the accompanying drawing, discloses a preferred embodiment thereof.

Referring to the drawing:

Figure 1 is a side elevation of a container having an attached straight bail and also showing a device in place on the bail for carrying out the method steps of the instant invention, such device being shown in section;

Fig. 2 is a front elevation of the container with this device for reforming its bail;

Fig. 3 is a fragmentary side elevation of the container illustrated in Fig. 1 showing the bail after being reformed; and Fig. 4 is a view similar to Fig. 3 showing the reformed bail in rotated position on top of the container as when in non-carrying position as for shipment and storage.

As a preferred embodiment of the invention the drawing illustrates a paint pail 11 having top and bottom closures 12 secured thereto by suitable seams 13. The pail is also provided with bail ears 14 disposed on opposite sides thereof and retaining the terminal ends 15 of a curved bail 16 of conventional shape. As viewed in Fig. 1 the bail at this stage of manufacture is straight and hangs down against the side wall of the pail.

In accordance with the steps of the instant method invention such a straight conventional bail 16 (Fig. 1) is first reformed into an angular shaped bail 18 (Fig. 3) having short vertical legs 19 which connect into the bail ears and a longer horizontal leg 21 which curves around the side wall of the pail. This reforming of the bail is effected while it is in place on the pail and is done by bending the bail on both sides of the pail at a predetermined distance from its terminal ends 15 and while the portion of the bail disposed between its ears and the points of bending is held tightly clamped against movement.

After reforming, the bail 18 may be pulled up and over the top of the pail and laid down into a storage position as shown in Fig. 4. In this storage position the vertical legs 19 of the bail extend up from the bail-ears 14 and the curved leg 21 which was not changed from its original shape now lies flat on top of the top closure seam 13. The original curve of the bail is such that it now conforms closely to the curvature of the closure seam 13. In such position it is away from the pail side wall. So that the reformed bail will seat nicely in this position its developed length before bending is carefully determined and the points of bend are so placed as to make the length of the legs 19 equal to or slightly greater than the distance between the center of the bail ears 14 and the upper edge of the top seam 13.

When it is desired to use the reformed bail as a carrying handle for the pail it may be readily lifted into an upright carrying position as shown in dotted lines in Fig. 3. The right angle bends in the bail in no way interfere with this main carrying or supporting function of the bail. The angular bends do shorten the carrying length of the bail but this has been found to be an advantage rather than a disadvantage in that it brings the hand grip portion of the bail closer to the pail and thereby prevents undue swinging of the pail when the latter is carried.

One form of apparatus for carrying out the method steps of the invention is illustrated in the drawing and comprises a bail bending or reforming device 31 (Figs. 1 and 2) which may be a hand tool or if desired may be a part of an automatic machine. There are preferably two of these devices, one for each side of the pail. Such devices may be identical in construction and operation and hence only one of them will be explained and described in detail.

Such a reforming device preferably includes a housing 32 having a circular recess 33 adapted to receive a bail ear 14 when the device is positioned adjacent a side of the pail 11. Adjacent the bail ear recess 33 the housing is formed with an anvil 34 which bears against the top side of the bail 16 as the latter hangs down against the side wall. The length of the anvil is such as to give a proper length to the leg 19 of the bail during reforming. For this purpose the anvil is provided with a right angle face or surface 35.

Opposite the anvil 34 the reforming device is provided with a clamp shoe 37 formed on a slide 38 disposed in guide ways 39 shaped in the housing 32. The face of the clamp shoe is formed with a curved clearance recess 41 for the bail ear 14. The slide is operated in any suitable manner, as for example, by a link or lever 42 which is secured to a lug 43 formed on the outer end of the slide.

Clamping of the bail in position prior to reforming is done by forcing the clamp slide 38 inwardly into its housing by pressure applied to the lever 42. This clamps the slide shoe 37 tightly against that portion of the bail 16 which is backed up by the anvil 34. It is while the bail is so held that the free or unclamped portion of the bail is bent at right angles to the clamped portion.

Bending of the bail is accomplished by a bending tool 45 which is formed on a slide 46 disposed in slideway 47 of the housing 32. A link or lever 48 secured to a lug 49 formed on the outer end of the slide is provided for manipulating this slide. The slideway 47 is parallel with the slideway 39 and is located so that the inner surface of the bending tool wipes against the outer edge of the clamping shoe 37. The bending tool is further formed with a curved nose 51 as shown in Fig. 1.

Hence when the bending slide 46 is moved toward the clamped bail 16 by pressure on its link or lever 48, the curved nose 51 of the bending tool 45 pushes against the unclamped portion of the bail and bends it around the outer corner of the anvil 34. This simultaneously wipes the bail into engagement with the outer end surface 35 of the anvil. The free portion of the bail is thus bent outwardly and upwardly into the position shown in dotted lines in Fig. 1. The result of this action is that the bail receives a permanent set since the yield point of its metal is exceeded and is permanently reformed.

Seating of the reformed bail in place on top of the pail when the pail is to be packed or stored may be done in any suitable manner. It is entirely practical to effect this seating by hand.

It is thought that the invention and many of its attendant advantages will be understood from the foregoing description, and it will be apparent that various changes may be made in the steps of the process described and their order of accomplishment without departing from the spirit and scope of the invention or sacrificing all of its material advantages, the process hereinbefore described being merely a preferred embodiment thereof.

I claim:

1. A method of reforming a straight container bail after it has been attached to bail ears of a container so that it will rest on top of the container out of engagement with the container side walls, which comprises clamping the inner portion of the attached bail against movement, and then bending the remaining outer unclamped portion of the bail into a permanent position and at an angle to the clamped portion around the clamping medium as a fulcrum so that the bail when rotated in its ears will rest on top of the container.

2. A method of reforming a straight container bail after it has been attached to bail ears of a container so that it will rest on top of the container out of engagement with the container side walls, which comprises clamping the inner portions of the attached bail on two sides of the container against movement, and then bending the intervening unclamped portion of the bail into a permanent position around the clamping medium as a fulcrum and at an angle to the clamped portions so that the bail will seat on top of the container when rotated in its ears.

3. A method of reforming a straight container bail after it has been attached to bail ears of a container so that it will rest on top of the container out of engagement with the container side walls, which comprises clamping the inner portions of the attached bail against movement adjacent its ears on its two sides, and then bending at an angle the unclamped portion of the bail at points adjacent the places where it is clamped and around the clamping medium as a fulcrum, to reform portion of said bail into an angular position relative to the clamped portion so that it will lie flat against the top of the container when the bail is rotated in its ears.

4. A method of reforming a straight container bail after it has been attached to bail ears of a container and so that it will rest on top of the container out of engagement with the container side walls, which comprises clamping the inner portion of the attached bail against movement, and then bending the remaining outer unclamped portion of the bail into a permanent position around the clamping medium as a fulcrum and at an angle to the clamped portion so that the bail will rest on top of the container when rotated in its ears, and placing the reformed bail thus produced into non-carrying position on top of the container.

RUSSELL C. TAYLOR.